UNITED STATES PATENT OFFICE.

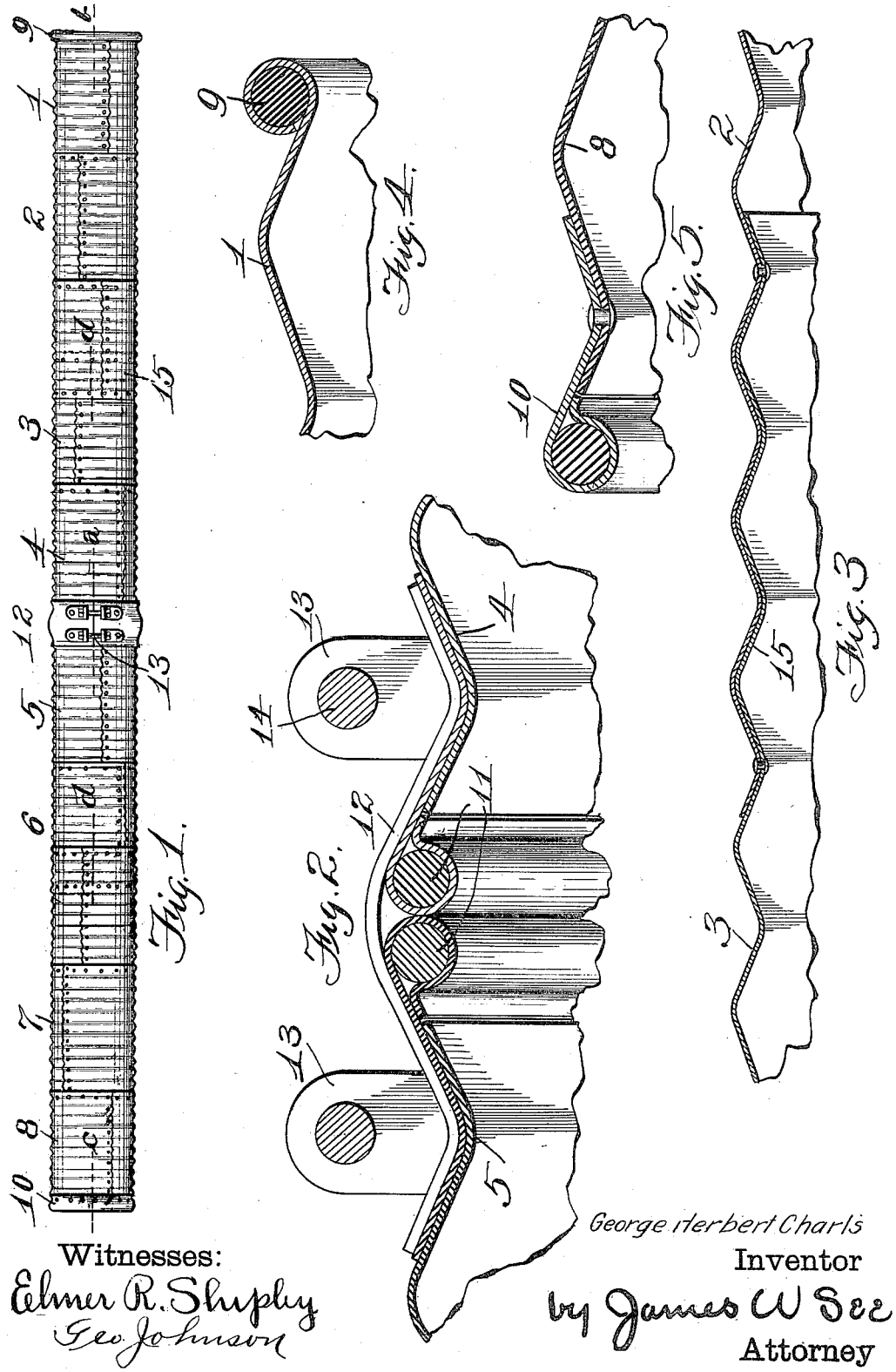

GEORGE HERBERT CHARLS, OF MIDDLETOWN, OHIO, ASSIGNOR TO THE AMERICAN ROLLING MILL COMPANY, OF NEWARK, NEW JERSEY.

SHEET-METAL CULVERT.

1,083,002. Specification of Letters Patent. Patented Dec. 30, 1913.

Application filed August 14, 1913. Serial No. 784,676.

*To all whom it may concern:*

Be it known that I, GEORGE HERBERT CHARLS, a citizen of the United States, residing at Middletown, Butler county, Ohio, have invented certain new and useful Improvements in Sheet-Metal Culverts, of which the following is a specification.

This invention, pertaining to circumferentially corrugated sheet metal culverts, relates to features of construction designed to guard such culverts in shipping, erection, and use, and to provide superior and efficient facilities for joining the sections, and to provide facilities for conveniently varying the length of a culvert built up of assembled sections, and to secure superior strength in the culvert.

After the sections of a corrugated sheet metal culvert have been produced in the shop it very frequently happens that, in the process of handling and shipping, the thin sheet metal edges of the ends of these sections become so distorted, by rough handling, that much trouble is experienced in so correcting the defects that the joints between the sections can be properly made. Again, when the sections of a corrugated sheet metal culvert have been delivered at the place of use, it is often found, in assembling and joining the sections, that the situation of use may call for a total length varying more or less from the original intention. Again, in assembling and joining the sections at the place of use it is of high importance that the joints be well formed and of adequate strength, especially in culverts involving considerable total length. Very often, in corrugated sheet metal culverts of considerable length, the conditions of support, as by the movement of the underlying dirt, may so change as to cause the culvert to be subjected to serious deflective strains tending to disorganize the joints between the sections.

Corrugated sheet metal culverts vary in diameter from six or seven inches to six or seven feet and are formed of sections about two feet long, the ends of adjoining sections being riveted together. These sections I will term unit sections, and under ordinary circumstances enough of these unit sections are riveted together to form the desired length of culvert or such portions of it as may be conveniently transported. In my improved construction, when conditions call for it, I unite several of these unit sections in the usual manner to form what I will term a minor section. I then unite a couple of these minor sections to form a major section with a specially strong joint and in doing so I provide for varying the length of the culvert in degrees less than the length of a unit section. I then unite the pair of major sections by a conveniently formed joint of peculiar strength which latter joint or coupling may, if desired, be applied in uniting the minor sections to each other.

My invention will be readily understood from the following description taken in connection with the accompanying drawing in which:—

Figure 1 is a side elevation of a culvert exemplifying my invention in a form comprising two major sections, each of which comprises two minor sections. Fig. 2 a longitudinal section through the joint uniting the two major sections, the section of this figure, being in the plane of line $a$ of Fig. 1; Fig. 3 a longitudinal section through the joint uniting the two minor sections, the section of the figure being in the plane of line $d$ of Fig. 1; Fig. 4 a longitudinal section at one end of the culvert in the plane of line $b$ of Fig. 1; and Fig. 5 a longitudinal section at one end of the culvert in the plane of line $c$ of Fig. 1.

In the drawing:—1 and 2 indicate two unit sections, united in the usual manner, and forming a minor section: 3 and 4 two similar unit sections similarly united and forming a second minor section, which minor section is united, as hereinafter described, to the first minor section to form a major section: 5, 6, 7 and 8, four unit sections arranged similarly to those of the first major section and forming the second major section which is united, as will be later explained, to the first major section: 9, a rodded reinforcement at the outer end of section 1: 10, a rodded reinforcement at the outer end of section 8: 11, rodded reinforcements at the inner abutting ends of sections 4 and 5: 12, an open joint-band encircling the joint between sections 4 and 5 and clasping the rodded reinforcements 11 and the first corrugations outwardly beyond them: 13, ears projecting outwardly from joint-band 12: 14, draw-bolts engaging these ears and serving to draw the joint-band tightly to place: and 15, the joints between unit sections 2 and 3, and also between unit sections 6 and 7.

Giving consideration to the major section formed by the unit sections 1, 2, 3 and 4, the joint between the two minor sections forming this major section is formed, as indicated in Fig. 3, by causing the corrugated metal of one section to so far overlap the corrugated metal of the other section as to bring about an extended length of double thickness at the joint, this double thickness comprising several of the corrugations, the number of corrugations overlapped being varied to permit of variations in the length of the culvert. Considering this right-hand major section of the culvert it will be seen to represent a beam strongest at a point intermediate in its length, and, similarly, with the major section at the left hand end of the culvert.

The joint-band 12 uniting the two major sections, is to be preferably of greater thickness than that of the general culvert, and the overlapping of this joint-band upon the two rodded reinforcements 11 and upon the contiguous corrugations of the culvert, produces a joint easily applied and of great strength.

Considering the entire culvert it is seen to represent a beam of extraordinary strength at an intermediate point.

The rodded reinforcements at the ends of the culvert, or at the ends where the joint is made by the joint-band 12, may be formed in various ways, their particular construction not forming part of my invention. The rodded reinforcements may be formed by inclosing the rod in an integral roll formed on the end of the section, as indicated at 9 in Figs. 1 and 4; or they may be formed by securing the rod in a roll formed in a separate band secured to the end of the section, as indicated at 10 in Figs. 1 and 5, either of these constructions of rodded reinforcement being applicable wherever rodded reinforcements are required about the culvert.

In practice with culverts of ordinary length the two major sections may be shipped separately and very conveniently coupled up in the field, or, if desired, the minor section may be left separate and united in the field.

It is to be observed that not only does the completed culvert represent a structure of great strength having well guarded ends, and convenient of erection, but also that in the prior handling and shipping of the major sections all the ends are guarded against mutilation so that the exposed ends of the completed culvert are in good shape and the coupled ends in good form for the reception of the joint-band. It is also to be observed that the rodded reinforcements on the culvert-portions are available as mere guards for the extreme ends of the culvert or as elements to operate in conjunction with the draw-band.

While I have set forth a culvert formed of two united major sections each formed of two united minor sections, it is to be understood that the system of construction may be applied to culverts having a number of sections greater or less than that set forth.

I claim:—

1. A circumferentially corrugated sheet metal culvert comprising, a pair of sections having rodded reinforcements at their abutting ends, an open joint-band clasping said abutting rodded reinforcements, and draw-bolts for forcing said joint-band to place, combined substantially as set forth.

2. A circumferentially corrugated sheet metal culvert comprising, a pair of sections having rodded reinforcements at their abutting ends, an open joint-band clasping said abutting rodded reinforcements and the corrugations contiguous thereto, and draw-bolts for forcing said joint-band to place, combined substantially as set forth.

3. A circumferentially corrugated sheet metal culvert comprising, a pair of sections each having rodded reinforcements at each of its ends, an open joint-band adapted to clasp the rodded reinforcements which may be placed in abutting relationship, and draw-bolts for forcing said joint-band to place, combined substantially as set forth.

4. A circumferentially corrugated sheet metal culvert comprising, a pair of sections each having a rodded reinforcement at each of its ends, an open joint-band adapted to clasp the rodded reinforcements which may be placed in abutting relationship and the corrugations contiguous thereto, and draw-bolts for forcing said joint-band to place combined substantially as set forth.

5. A circumferentially corrugated sheet metal culvert comprising, a first plurality of minor sections secured together by a joint in which the end of one section surrounds the end of the other section and overlaps a plurality of the corrugations thereof to form a major section, a second similar major section, an open joint-band clasping the abutting ends of the major sections, and draw-bolts for forcing said joint-band to place, combined substantially as set forth.

6. A circumferentially corrugated sheet metal culvert comprising, a first plurality of minor sections secured together by a joint in which the end of one section surrounds the end of the other section and overlaps a plurality of the corrugations thereof to form a major section, a second similar major section, rodded reinforcements on the contiguous ends of the major sections, an open draw-band adapted to clasp said rodded reinforcements, and draw-bolts for forcing said draw-band to place, combined substantially as set forth.

7. A circumferentially corrugated sheet metal culvert comprising, a first plurality of minor sections secured together by a joint in which the end of one section surrounds the end of the other section and overlaps a plurality of the corrugations thereof to form a major section, a second similar major section, rodded reinforcements on the contiguous ends of the sections, an open draw-band clasping said abutting rodded reinforcements and the corrugations contiguous thereto, and draw-bolts for forcing said joint-band to place, combined substantially as set forth.

GEORGE HERBERT CHARLS.

Witnesses:
L. E. KITTLE,
A. P. PREYER.